May 16, 1967  G. R. WRIGHT  3,319,372
MINNOW BUCKET

Filed Dec. 21, 1964  2 Sheets-Sheet 1

INVENTOR.
GEORGE R. WRIGHT

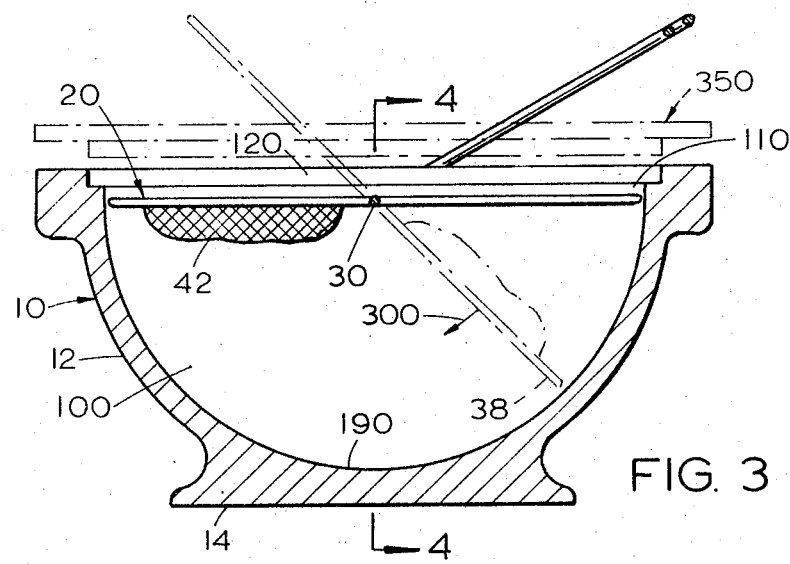
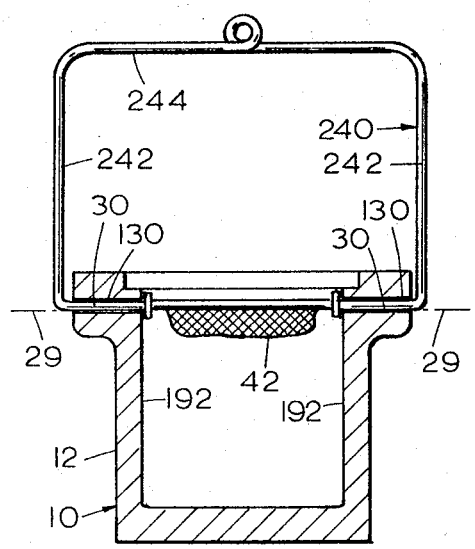
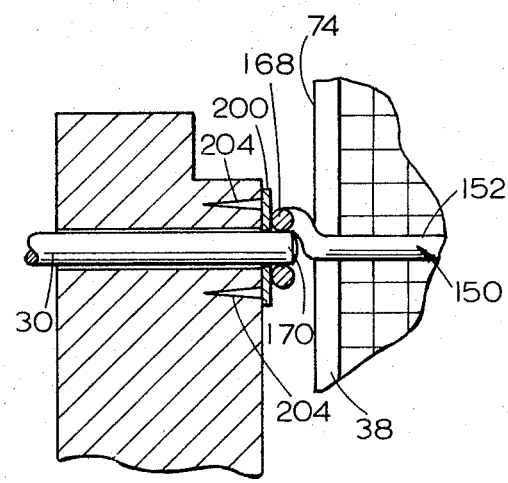

3,319,372
MINNOW BUCKET
George R. Wright, 1619 Circle Drive,
Lincoln, Nebr. 68506
Filed Dec. 21, 1964, Ser. No. 419,788
1 Claim. (Cl. 43—56)

This invention relates to minnow containers and more particularly it is an object to provide a minnow container which is adapted to achieve a maximum of operational efficiency at a minimum of cost.

In the prior art minnow containers having minnow catching scoops have been proposed with the scoop attached to a perforated cover by a linkage system thus involving separate hinges or pivot mountings for both scoop and cover, and cost of such linkage systems.

It is an object of this invention to provide the concept in which a scoop is mounted on an axis with the control lever on the opposite side of the axis so that the swinging of the scoop is controlled by manipulating the control lever, more particularly in which the control lever and the scoop are both of sufficient area so as to form the parts of a perforate cover, so that when they are in horizontal or storage position they serve as a perforate cover for the upper opening of the minnow container. In this way a single pivotal mounting serves to pivotally mount both scoop and cover.

Those containers of the prior art which have had swinging minnow scoops have not been designed for the catching of substantially all minnows with a single scooping motion. This would make it difficult to catch the last few minnows.

It is therefore an object of this invention to provide the concept of a container having portions disposed farther from the scoop rotation axis which are of arcuate shape extending substantially to a minnow delivery position of the scoop and so that the bottoms and sides of the container are sufficiently complemental to the swath of the scoop that during a scooping motion substantially all minnows would be caught.

A still further object is to provide a container, the scoop portion of which has a flexible net portion of a sufficient fullness and flexibility as to hang out rearwardly of the scoop frame when the scoop is moved through the water so as to entrap minnows therein and so that when a rigid or frame portion of the scoop is held in a position approximately at the surface of water in the container, minnows in the flexible net portion will remain below the surface of the water, and whereby when the scoop portion of the device is in a horizontal storage position its net will not protrude upwardly therefrom but will be in a position not interfering with the placement of a lid on the container close to the scoop storage position.

A further object is to provide a minnow container as described the sides of which can be made of weak heating insulating material by the use of reinforcing members economically and quickly insertable into portions surrounding axle means by the concept of prongs on the reinforcing members received in the container.

Still another object is to provide a container achieving economy through the use of inner extending lower ends of a carrying bail as stub axles for pivotally supporting scoop mounting means.

Other and further objects and advantages of the present invention will be apparent from the following detailed description, drawings, and claim, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claim.

In the drawings:

FIGURE 3 is a sectional view taken along the line 3—3 of FIGURE 2 showing the scoop of the invention in delivery position in full lines and in a scooping position in dotted lines. An optional lid is shown mostly in dotted lines.

FIGURE 4 is a sectional view taken along the line 4—4 of FIGURE 3.

FIGURE 5 is a sectional view taken along the line 5—5 of FIGURE 2.

Figure 1:
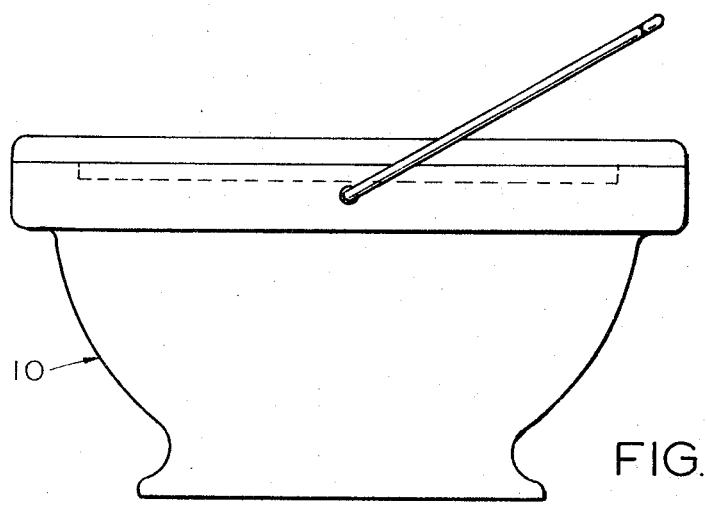
FIGURE 1 is a side elevation of the minnow container of this invention.

The minnow container of this invention is generally indicated at 10 and has a housing 12 having an under surface 14 which is horizontal and is so constructed for holding the container upright when rested on a horizontal surface.

A perforate minnow scoop generally indicated at 20 is provided in the housing 12, the scoop 20 being adapted to pivot about a horizontal axis through the centers of stub axles 30, best seen in FIGURE 4.

The scoop 20 has a rigid portion generally indicated at 34 which has a frame section 38 preferably made of heavy wire outlining a relatively rigid mesh portion 40 of the scoop which surrounds and supports a flexible net portion of the scoop, the net portion 42 being permanently attached to the rigid mesh portion 40.

A scoop control lever generally indicated at 70 is disposed on the opposite side of an axis through the stub axle 30 from the scoop portion 38.

The control means or control lever 70 has an outer frame portion 74 which can be formed of heavy wire and the wire of the outer frame portion 74 can be continuous with and integral with the wire outer frame portion 38 of the scoop whereby the two frame portions together form preferably substantially an oblong rectangle of which two U-shaped half portions serve as the scoop 20 and control lever 70, respectively.

The area bounded by the substantially U-shape outer rfame portion 74 of the scoop control lever and the axis 29 through the axles 30 is filled with a preferably rigid wire mesh 80 which can be continuous with the rigid wire mesh portion 40 earlier described.

Means are provided for attaching the scoop control means 70 with the scoop 20 and this is preferably defined by an integral interconnection between the frames 38 and 74 of the scoop and scoop control lever.

The container 10 has a hollow interior 100 and an open top 110. The stub axles 30 extend through side walls 120 of the container 10, being rotatably received in stub axle receiving passages 130.

Figure 2:
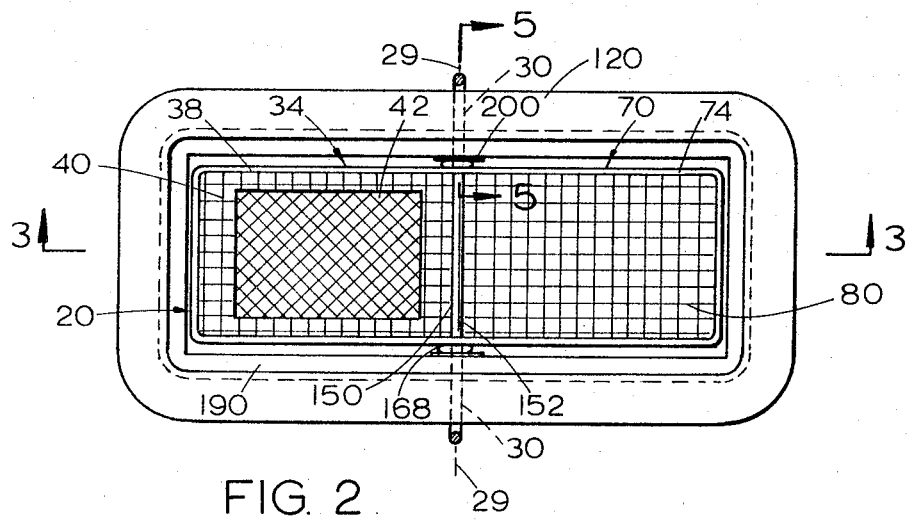
FIGURE 2 is a top plan view of the container of FIGURE 1.

An axle receiving member 150, best seen in FIGURES 2 and 5, has a central portion 152 extending across the scoop control lever portions substantially on the axis 29, end portions 168 of the axle receiving member 150 being wrapped around and rotatably received on inner ends 170 of the stub axles 30.

The axle receiving member 150 is suitably connected to adjacent parts of the rigid frames 38 and 74.

As best seen in FIGURE 2 the scoop control means or lever 70 is preferably of a horizontal area substantially to fill the opening 110 of the container so as to prevent minnows from escaping from the opening 110 at times when the scoop and control means are in horizontal positions as occurs because the scoop and control means lie in substantially the same plane.

As best seen in FIGURES 2 and 3 the bottom 190 and the sides 192 of the container 10 are disposed sufficiently close to the swath of said scoop 20 as it moved that during a scooping motion through the container substantially all of the minnows therein would be scooped.

The housing 12 is preferably made of weak porous material, such as for example, polystyrene or other material having heat insulation properties. The stub axles would wear against such a weak material and for that reason a reinforcing member 200, best seen in FIGURE 5, is provided and closely surrounds a respective axle 30 of the scoop about the axis 29, there being one member 200 on each side of the container to prevent distortion of the weak material of the housing 12 from the pressures of the stub axles 30.

Each reinforcing member 200 preferably has an anchoring prong 204 extending inwardly of the container housing 12.

As best seen in FIGURE 4, the container has a bail, generally indicated at 240 thereabove, having side portions 242 interconnected by an upper portion 244. The stub axles 30 are attached at their outer ends to the sides 242 of the bail 240 so that the stub axles serve a double purpose as axles and also to rotatably anchor the bail 240.

The flexible net portion 42 of the scoop preferably comprises the majority of the area bounded by the scoop side frame 38. The flexible net portion 42 has a sufficient fullness of material which is sufficiently flexible as to hang out rearwardly of the scoop frame 38 at times when the scoop is moved in a scooping direction through the water. Such scooping direction is indicated by the arrow 300 in FIGURE 3 whereby the net portion 42 serves to entrap minnows effectively so as to hold the minnows under water at times when the rigid scoop portion 34 is approximately at the surface of water in the container as would be the case when it is substantially horizontal, as best seen in FIGURE 3, assuming the water level in FIGURE 3 is up to the axles 30.

Although the scoop and control lever portions 20 and 70 when in horizontal positions are adapted to form the parts of a perforate cover for the container, yet a removable lid 350 may also be desired and to illustrate this a removed lid is shown in dotted lines in FIGURE 3.

The scoop 20 and scoop control lever 70 are maintained in the horizontal container-covering positions against the force of gravity after they have once been put in covering position by means of providing a sufficient frictional engagement between those portions 168 of the axle-receiving member 150 and the respective stub axles 30.

From the foregoing description, it is thought to be obvious that a minnow bucket constructed in accordance with my invention is particularly well adapted for use, by reason of the convenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

I claim:

A minnow container comprising a housing having an undersurface constructed for holding the container upright when rested on a horizontal surface, a perforate minnow scoop in said housing, axle means and cooperative axle receiving means mounting said scoop on said housing in a manner whereby said scoop is adapted to swing about a horizontal axis, scoop control means disposed on the opposite side of said axis from said scoop, said control means being elongated in a direction extending away from said scoop so as to serve as a scoop control lever, means for attaching said control means to said scoop whereby when said control means is raised from a position on one side of said axis across the top of said axis toward a position on the other side of said axis said scoop will simultaneously swing through said container, said container having an upper opening and in which said scoop and said control means are of a horizontal area sufficient to substantially fill said opening so as to prevent minnows from escaping through said opening at times when said scoop and said control means are in approximately horizontal positions.

References Cited by the Examiner
UNITED STATES PATENTS

| 372,124 | 10/1887 | Craig | 43—56 |
| 986,229 | 3/1911 | Seeger | 43—56 |
| 3,039,225 | 6/1962 | Semelka | 43—56 |

SAMUEL KOREN, *Primary Examiner.*

D. J. LEACH, *Assistant Examiner.*